United States Patent
Liang

(10) Patent No.: US 9,785,396 B2
(45) Date of Patent: Oct. 10, 2017

(54) MOBILE DEVICE

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Yu Liang, Shenzhen (CN)

(73) Assignees: Fu Tai Hua Industry (Shenzhen) Co., Ltd., Shenzhen (CN); HON HAI PRECISION CO., LTD., New Taipei (TW)

( * ) Notice: Subject to any disclaimer, the term of this patent is extended or adjusted under 35 U.S.C. 154(b) by 19 days.

(21) Appl. No.: 14/974,566

(22) Filed: Dec. 18, 2015

(65) Prior Publication Data

US 2017/0153861 A1 Jun. 1, 2017

(30) Foreign Application Priority Data

Nov. 30, 2015 (CN) .......................... 2015 1 0849186

(51) Int. Cl.
*G06F 3/14* (2006.01)
*G06F 1/16* (2006.01)

(52) U.S. Cl.
CPC .......... *G06F 3/1446* (2013.01); *G06F 1/1633* (2013.01); *G06F 3/1431* (2013.01)

(58) Field of Classification Search
CPC ..... G06F 3/1446; G06F 1/1633; G06F 3/1431
See application file for complete search history.

(56) References Cited

U.S. PATENT DOCUMENTS

| | | | | |
|---|---|---|---|---|
| 2,383,347 A | * | 8/1945 | Silge ...................... | G01N 21/43 356/135 |
| 4,043,116 A | * | 8/1977 | Schlappi ................ | G04B 19/00 368/223 |
| 4,623,225 A | * | 11/1986 | Forkner .................. | G02B 5/04 359/669 |
| 4,885,856 A | * | 12/1989 | Cameron ................ | G09F 19/14 359/833 |
| 8,385,707 B2 | * | 2/2013 | Salters ................. | G02B 6/0076 385/133 |

(Continued)

OTHER PUBLICATIONS

Philips Television EN user manual; published May 4, 2012; http://www.p4c.philips.com/cgi-bin/cpindex.pl?ctn=42PFL7606H/12&hlt=Link_UserManuals&mid=Link_UserManuals&scy=LT&slg=AEN; pp. 19-20.*

(Continued)

*Primary Examiner* — Ilana Spar
*Assistant Examiner* — Mihir K Rayan
(74) *Attorney, Agent, or Firm* — Steven Reiss

(57) ABSTRACT

A mobile device includes a main body, a display secured to the main body, and at least one refractor integrated with the display. The main body includes a storage device, a controller, and a switch unit coupled to the controller. A video content is stored in the storage device, and a switch unit is used to open or close the controller. The at least one refractor is used to define at least one projection region. When the controller is opened by the switch unit, the video content is divided into a plurality of video segments to be played on the display and the at least one projection region, and when the controller is closed by the switch unit, the video content is displayed on the display.

7 Claims, 6 Drawing Sheets

(56) References Cited

U.S. PATENT DOCUMENTS

| | | | | |
|---|---|---|---|---|
| 8,449,118 | B2* | 5/2013 | Kuncl | G03B 21/14 349/5 |
| D714,752 | S* | 10/2014 | Im | D14/138 G |
| D743,089 | S* | 11/2015 | Sugihara | D26/113 |
| 9,230,515 | B2* | 1/2016 | Liu | G09G 5/30 |
| 2006/0077544 | A1* | 4/2006 | Stark | G02F 1/13336 359/448 |
| 2006/0146012 | A1* | 7/2006 | Arneson | G02B 27/01 345/156 |
| 2007/0242162 | A1* | 10/2007 | Gutta | H04N 9/12 348/645 |
| 2009/0091477 | A1* | 4/2009 | McCall | G01S 19/42 340/990 |
| 2009/0143098 | A1* | 6/2009 | Shiono | H04M 1/0272 455/556.1 |
| 2011/0014955 | A1* | 1/2011 | Kim | G02F 1/133603 455/566 |
| 2012/0169765 | A1* | 7/2012 | Xu | G06F 1/1647 345/619 |
| 2013/0335379 | A1* | 12/2013 | Sharma | G06F 1/1639 345/175 |

OTHER PUBLICATIONS

Ramus Larsen; Philips' 2011 TV line-up; Mar. 8, 2011; www.flatpenslshd.com/article.php?subaction=showfull&id=1299599447.*

* cited by examiner

MOBILE DEVICE

FIELD

The subject matter herein generally relates to mobile devices, and particularly, to a mobile device capable of projecting an extended display screen.

BACKGROUND

There are a wide variety of mobile devices that include displays for viewing video content. Such mobile display devices include but are not limited to smart phones, tablet computers, notebooks, laptop computers, personal media players, handheld game consoles, and the like. For reasons relating to portability and battery life, these mobile display devices are typically limited to relatively small physical dimensions. As such, the displays for these devices may be small and difficult to see for others to view along with the user.

BRIEF DESCRIPTION OF THE DRAWINGS

Implementations of the present technology will now be described, by way of example only, with reference to the attached figures.

DETAILED DESCRIPTION

Figure 1:
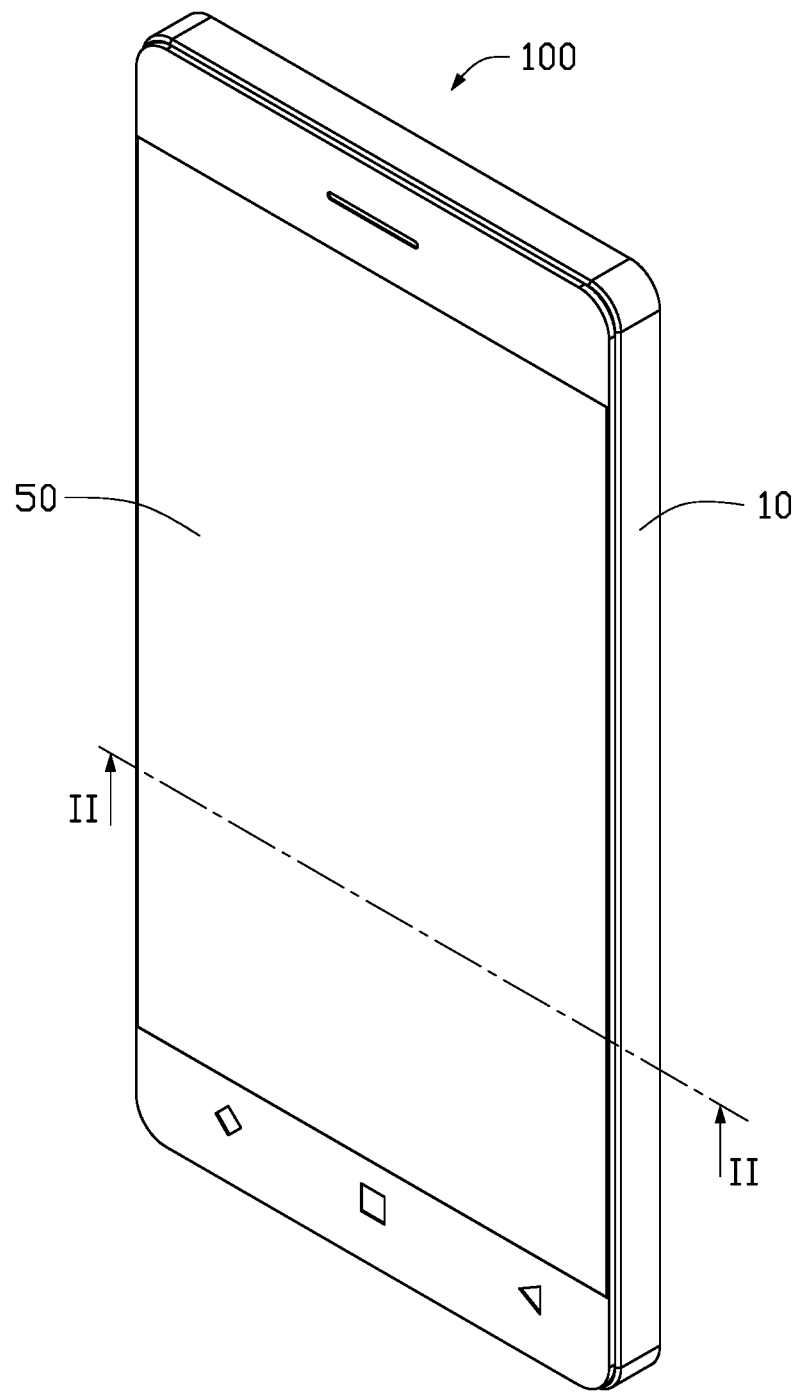
FIG. 1 is an isometric view of an example embodiment of a mobile device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like. In general, the word "module", as used herein, refers to logic embodied in hardware or firmware, or to a collection of software instructions, written in a programming language. The software instructions in the modules may be embedded in firmware, such as in an erasable programmable read-only memory (EPROM) device. The modules described herein may be implemented as either software and/or hardware modules and may be stored in any type of computer-readable medium or other storage device.

The present disclosure is described in relation to a mobile device.

FIG. 1 illustrates an embodiment of a mobile device 100. The mobile device 100 includes a main body 10, a storage device 20 (see FIG. 4) located in the main body 10, a controller (see FIG. 4) located in the main body 10, and a display 50 secured to the main body 100. In at least one embodiment, the mobile device 100 can include but is not limited to smart phones, tablet computers, notebooks, laptop computers, personal media players, handheld game consoles, and the like. For example, a smart phone can be shown in FIG. 1.

Figure 2:
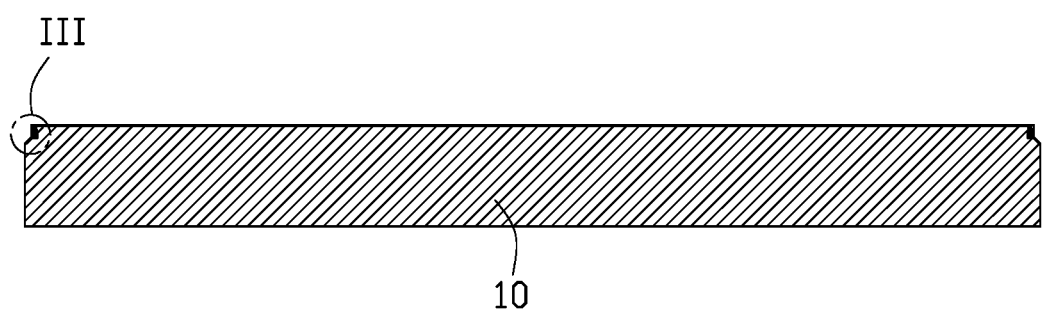
FIG. 2 is a cross-section view of FIG. 1, taken along a line II-II.
Figure 3:
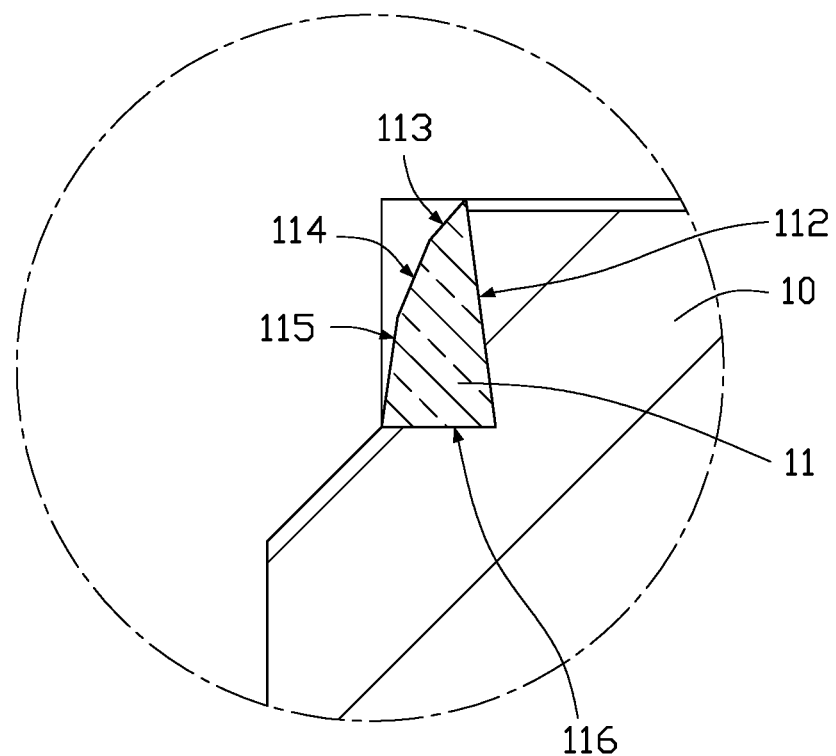
FIG. 3 is an enlarged view of a circled portion III of FIG. 2.

FIGS. 2-3 illustrate an embodiment of the main body 10 of the mobile device 100. At least one refractor 11 is secured to the main body 10. In at least one embodiment, the at least one refractor 11 can include but are not limited to two prisms which can be integrated with opposite edges of the display 50. The at least one refractor 11 is configured to refract a plurality of lights to define a projection region 60 (see FIG. 6).

FIG. 3 illustrates an embodiment of the refractor 11 of the mobile device 100. The refractor 11 can include an in-light surface 112, a first out-light surface 113, a second out-light surface 114, a third out-light surface 115, and a coupling surface 116. In at least one embodiment, the first out-light surface 113 is coupled to the in-light surface 112, and a sharp angle is defined between the first out-light surface 113 and the in-light surface 112. The second out-light surface 114 is coupled to the first out-light surface 113 and the third out-light surface 115. The third out-light surface 115 is coupled to the coupling surface 116, and a sharp angle is define between the third out-light surface 115 and the coupling surface 116. An obtuse angle is defined between the first out-light surface 113 and the second out-light surface 114, and an obtuse angle is defined between the second out-light surface 114 and the third out-light surface 115.

Figure 4:
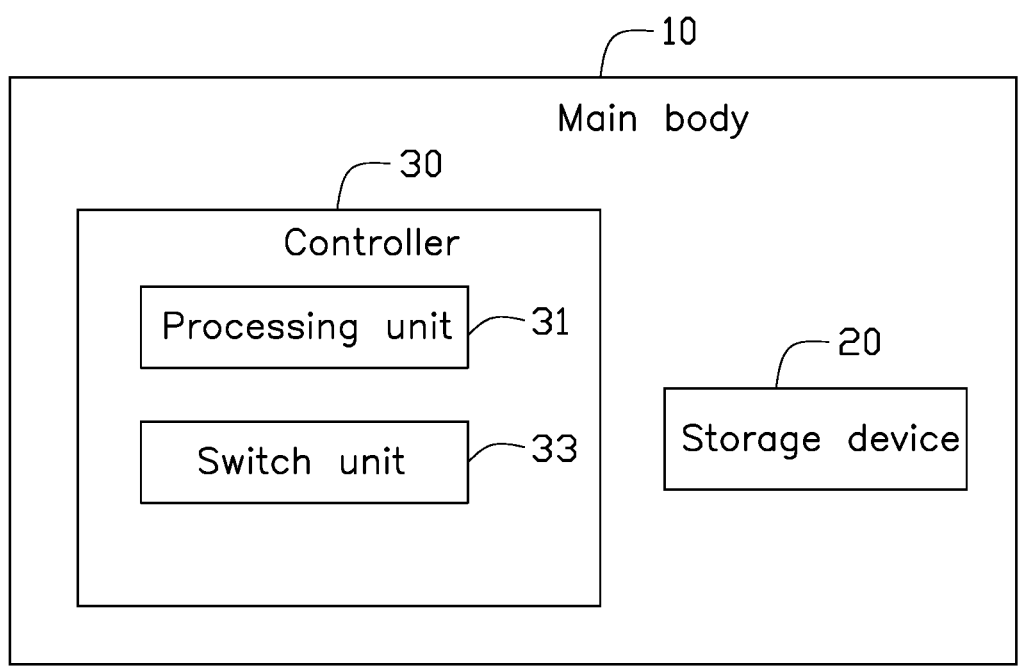
FIG. 4 is a diagrammatic view of a main body of the mobile device of FIG. 1.

FIG. 4 illustrates an embodiment of the mobile device 100. The storage device 20 is used to store video content that can be played on the display 50 and the projection region 60. The controller 30 is coupled to the storage device 20 and includes a processing unit 31 and a switch unit 33. In one embodiment, the controller 30, which includes the processing unit 31 and the switch unit 33, is comprised of computerized instructions in the form of one or more computer-readable programs stored in the storage device 20 and executed by the controller 30. FIG. 4 is only one example of the main body 10, other examples may comprise more or fewer components than those shown in the illustrated embodiment, or have a different configuration of the various components. In at least one embodiment, the storage device 20 can be a random access memory (RAM) for temporary storage of information, and/or a read only memory (ROM) for permanent storage of information, In at least one embodiment, the storage device 20 also can be an external storage device, such as an external hard disk, a storage card, or a data storage medium.

The processing unit 31 is used to divide the video content into a plurality of video segments for allowing the plurality of video segments to be played on the display 50 and the projection regions 60. For example and shown in FIG. 6, if two refractors 11 are located on two opposite edges of the display 50, the video content in the storage device 30 can be divided to three video segments by the processing unit 31, a first video segment can be shown on the display 50, and two second compressed video segments can be shown on the two projection regions 60.

Figure 5:
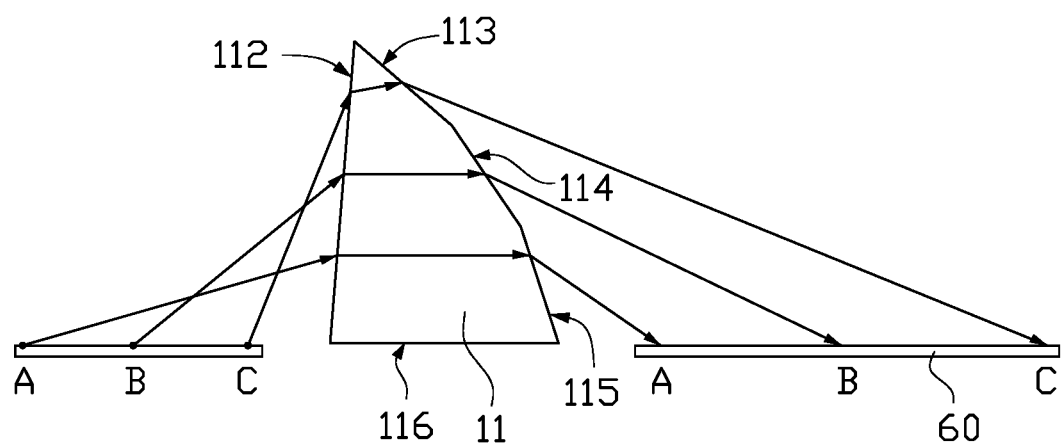
FIG. 5 is a diagrammatic view of a refractor of the mobile device of FIG. 1.

FIG. 5 illustrates the refractor 11 being used. For example, a plurality of lights including the second video segment, such as point A, point B, and point C can be shown. The plurality of lights can emit into the refractor 11 via the in-light surface 112, and out of the refractor 11 via the first out-light surface 113, the second out-light surface 114 and the third out-light surface 115 to define the projection region 60. Therefore, the two second compressed video segments can be enlarged by the refractor 11 and displayed on the projection region 60.

The switch unit 33 is coupled to the processing unit 31 and is used to open or close the processing unit 31. When the processing unit 31 is opened by the switch unit 33, the video content is divided into a plurality of video segments to be played on the display 50 and the projection regions 60. When the processing unit 31 is closed by the switch unit 33, the video content can be displayed on the display 50. In at least one embodiment, the switch unit 33 can be a touch point in an application, or a button secured to the main body 10.

Figure 6:
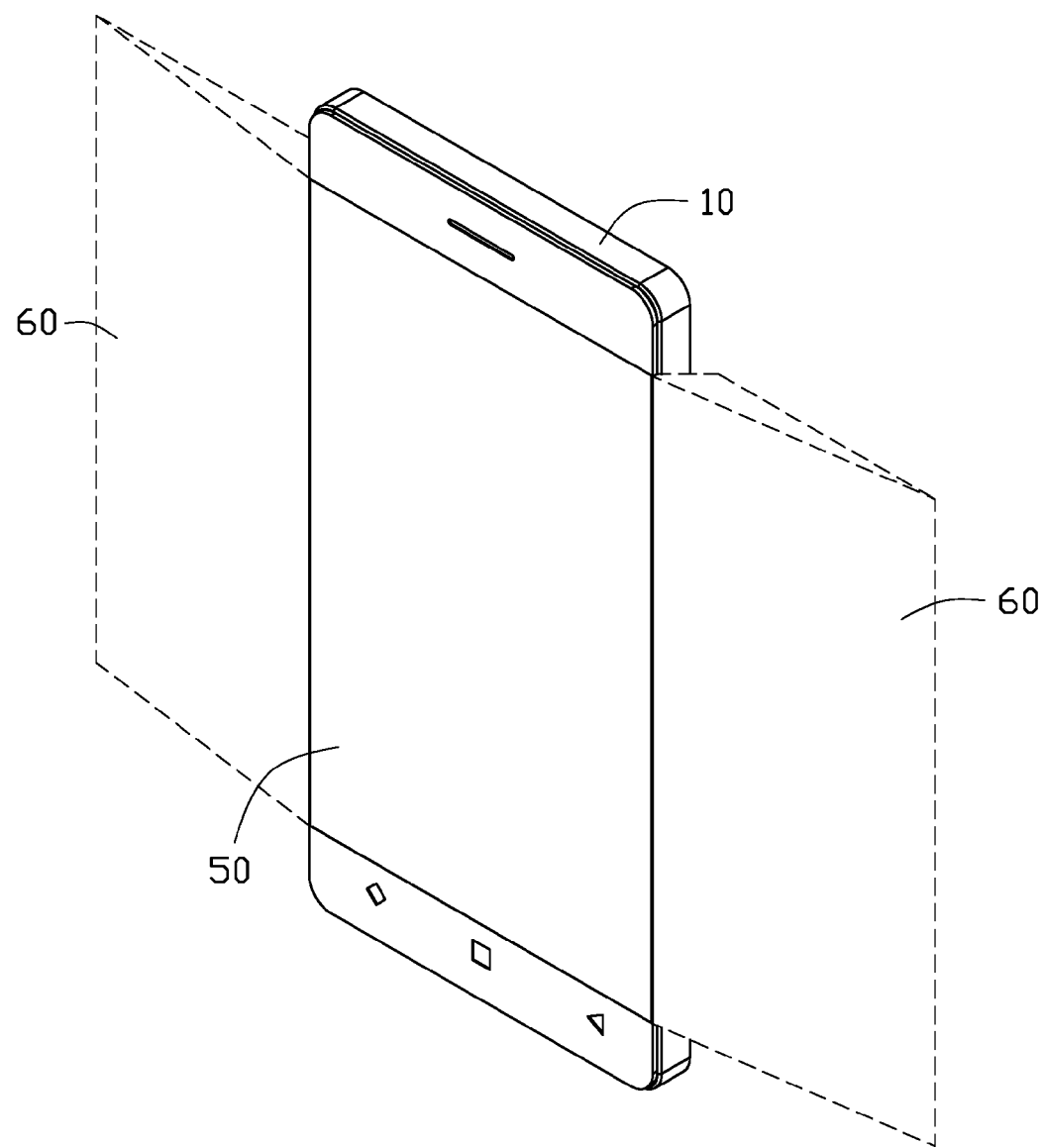
FIG. 6 is a similar to FIG. 1, and two projection regions are shown.

FIGS. 5-6 illustrates the mobile device 100 being used. In use, when the mobile device 10 does not extend a display screen, the processing unit 31 is closed by the switch unit 33, and the video content can be displayed on the display 50. When the mobile device 10 needs an extended display screen, the processing unit 31 is opened by the switch unit 33, and the video content is divided into a plurality of video segments to be played on the display 50 and the projection regions 60.

The embodiments shown and described above are only examples. Many details are often found in the art such as the other features of a mobile device. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A mobile device comprising:
    a main body comprising a storage device and a controller;
    a video content stored in the storage device;
    a display secured to the main body; and
    at least one refractor integrated with the display, the at least one refractor configured to define at least one projection region;
    wherein the controller is configured to divide the video content into a plurality of video segments to be played on the display and the at least one projection region;
    wherein the at least one refractor comprises two prisms, and the two prisms are located on opposite edges of the display, each prism comprises an in-light surface, a coupling surface, and a plurality of out-light surfaces coupled to the in-light surface and the coupling surface, a sharp angle is defined between the in-light surface and the coupling surface, and an obtuse angle is defined between every two adjacent out-light surfaces.

2. The mobile device of claim 1, wherein the plurality of out-light surfaces comprises a first out-light surface coupled to the in-light surface, a second out-light surface and a third out-light surface coupled to the coupling surface, the second out-light surface is coupled to the first out-light surface and the third out-light surface, a sharp angle is defined between the first out-light surface and the in-light surface, and a sharp angle is defined between the third out-light surface and the coupling surface.

3. The mobile device of claim 1, wherein the controller comprises a switch unit configured to open or close the controller, when the controller is opened by the switch unit, the video content is divided into a plurality of video segments to be played on the display and the at least one projection region, and when the controller is closed by the switch unit, the video content is displayed on the display.

4. The mobile device of claim 1, wherein the mobile device is a smart phone, a tablet computer, a notebook, a laptop computer, or a personal media player.

5. A mobile device comprising:
    a main body comprising a storage device, a controller, a switch unit coupled to the controller; a video content stored in the storage device; the switch unit configured to open or close the controller;
    a display secured to the main body; and
    at least one refractor integrated with the display; the at least one refractor configured to define at least one projection region;
    wherein when the controller is opened by the switch unit, the video content is divided into a plurality of video segments to be played on the display and the at least one projection region, and when the controller is closed by the switch unit, the video content is displayed on the display;
    wherein the at least one refractor comprises two prisms, and the two prisms are located on opposite edges of the display, each prism comprises an in-light surface, a coupling surface, and a plurality of out-light surfaces coupled to the in-light surface and the coupling surface, a sharp angle is defined between the in-light surface and the coupling surface, and an obtuse angle is defined between every two adjacent out-light surfaces.

6. The mobile device of claim 5, wherein the plurality of out-light surfaces comprises a first out-light surface coupled to the in-light surface, a second out-light surface and a third out-light surface coupled to the coupling surface, the second out-light surface is coupled to the first out-light surface and the third out-light surface, a sharp angle is defined between the first out-light surface and the in-light surface, and a sharp angle is defined between the third out-light surface and the coupling surface.

7. The mobile device of claim 5, wherein the mobile device is a smart phone, a tablet computer, a notebook, a laptop computer, or a personal media player.

* * * * *

UNITED STATES PATENT AND TRADEMARK OFFICE
CERTIFICATE OF CORRECTION

PATENT NO. : 9,785,396 B2
APPLICATION NO. : 14/974566
DATED : October 10, 2017
INVENTOR(S) : Yu Liang It is certified that error appears in the above-identified patent and that said Letters Patent is hereby corrected as shown below:

On the Title Page

Please replace Item (73) regarding "Assignees" with the following:
(73) Assignees: Fu Tai Hua Industry (Shenzhen) Co., Ltd., Shenzhen (CN);
HON HAI PRECISION INDUSTRY CO., LTD., New Taipei (TW)

Signed and Sealed this
Fourth Day of December, 2018

Andrei Iancu
*Director of the United States Patent and Trademark Office*